US011528523B2

(12) United States Patent
Hunacek et al.

(10) Patent No.: US 11,528,523 B2
(45) Date of Patent: *Dec. 13, 2022

(54) METHOD AND SYSTEM TO SHARE A SNAPSHOT EXTRACTED FROM A VIDEO TRANSMISSION

(71) Applicant: NAGRAVISION S.A., Cheseaux-sur-Lausanne (CH)

(72) Inventors: Didier Hunacek, Blonay (CH); Olivier Schaer, Prevonloup (CH); Frederic Thomas, Onex (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,226

(22) Filed: Jun. 17, 2021

(65) Prior Publication Data

US 2021/0385517 A1     Dec. 9, 2021

Related U.S. Application Data

(63) Continuation of application No. 16/076,964, filed as application No. PCT/EP2017/052949 on Feb. 10, 2017, now Pat. No. 11,070,863.

(30) Foreign Application Priority Data

Feb. 12, 2016   (EP) .................................. 16155390

(51) Int. Cl.
  *G06F 15/16*      (2006.01)
  *H04N 21/2743*    (2011.01)
  (Continued)

(52) U.S. Cl.
  CPC ....... *H04N 21/2743* (2013.01); *H04L 67/568* (2022.05); *H04N 21/4331* (2013.01);
  (Continued)

(58) Field of Classification Search
  None
  See application file for complete search history.

(56) References Cited

U.S. PATENT DOCUMENTS

| 7,047,305 B1 | 5/2006 | Brooks |
| 11,070,863 B2 | 7/2021 | Hunacek et al. |

(Continued)

FOREIGN PATENT DOCUMENTS

| EP | 1 921 852 A1 | 5/2008 |
| EP | 1921852 A1 | 5/2008 |
| WO | WO 2017/137533 A1 | 8/2017 |

OTHER PUBLICATIONS

International Preliminary Report on Patentability for PCT Application No. PCT/US2017/052949 dated Aug. 14, 2018, 6 pages.

(Continued)

*Primary Examiner* — Razu A Miah
(74) *Attorney, Agent, or Firm* — Polsinelli LLP

(57) ABSTRACT

The present invention refers to the field of television experience in particular the simultaneous use of the portable computing device and a television to share a user's experience. The present disclosure proposes a method to create a snapshot from a video transmission received by a receiver, said receiver being connected with a portable computing device and having a screen output, said method comprising the steps of receiving a video transmission by the receiver, converting by the receiver, the video transmission into a lower-bandwidth video transmission, sending the lower-bandwidth video transmission to the portable computing device, receiving from the portable computing device to the receiver, a command to execute a snapshot, producing by the receiver a snapshot from the video transmission, sending the snapshot to the portable computing device.

20 Claims, 4 Drawing Sheets

(51) Int. Cl.
  *H04N 21/475* (2011.01)
  *H04N 21/4788* (2011.01)
  *H04N 21/433* (2011.01)
  *H04L 67/568* (2022.01)
  *H04N 21/61* (2011.01)
  *H04N 21/8549* (2011.01)

(52) U.S. Cl.
  CPC ..... *H04N 21/4756* (2013.01); *H04N 21/4788* (2013.01); *H04N 21/6131* (2013.01); *H04N 21/8549* (2013.01)

(56) References Cited

U.S. PATENT DOCUMENTS

| | | |
|---|---|---|
| 2002/0056120 A1 | 5/2002 | McTernan |
| 2005/0060751 A1 | 3/2005 | Glaser |
| 2005/0071782 A1 | 3/2005 | Barrett |
| 2005/0144302 A1* | 6/2005 | Kirkpatrick ............ H04N 21/84 707/999.01 |
| 2005/0166245 A1* | 7/2005 | Shin ................... H04N 21/2343 348/E7.071 |
| 2005/0249139 A1* | 11/2005 | Nesbit .................... H04H 20/08 348/E7.071 |
| 2006/0218480 A1* | 9/2006 | Moggert ............ H04L 67/2823 715/203 |
| 2007/0019068 A1 | 1/2007 | Arseneau |
| 2007/0035623 A1 | 2/2007 | Garoutte |
| 2007/0041462 A1 | 2/2007 | Kim |
| 2007/0139443 A1 | 6/2007 | Marks |
| 2007/0288970 A1 | 12/2007 | Tedenvall |
| 2008/0320546 A1 | 12/2008 | Moon |
| 2010/0036854 A1 | 2/2010 | Regan |
| 2010/0235438 A1 | 9/2010 | Narayanan |
| 2011/0150433 A1 | 6/2011 | Alexandrov |
| 2012/0054818 A1* | 3/2012 | Noh ..................... H04N 21/222 725/143 |
| 2012/0254716 A1 | 10/2012 | Choi |
| 2012/0303834 A1 | 11/2012 | Adam |
| 2013/0039433 A1* | 2/2013 | Ralston ................ G11B 27/036 375/240.26 |
| 2013/0093832 A1 | 4/2013 | Konda |
| 2013/0305283 A1 | 11/2013 | Yoon |
| 2013/0307970 A1 | 11/2013 | Barak |
| 2013/0321559 A1 | 12/2013 | Wu |
| 2013/0347019 A1 | 12/2013 | Herlein |
| 2014/0002389 A1 | 1/2014 | Kim |
| 2014/0032735 A1 | 1/2014 | Kapoor |
| 2014/0078239 A1 | 3/2014 | Nakade |
| 2014/0082130 A1 | 3/2014 | Sharma |
| 2014/0082208 A1 | 3/2014 | Ojanpera |
| 2014/0189042 A1* | 7/2014 | Chen ................. H04N 21/4756 709/213 |
| 2014/0327831 A1 | 11/2014 | Liu |
| 2014/0328578 A1 | 11/2014 | Shafron |
| 2015/0095433 A1 | 4/2015 | Grossman |
| 2015/0113063 A1 | 4/2015 | Liu |
| 2015/0130892 A1 | 5/2015 | Whynot |
| 2015/0271049 A1 | 9/2015 | Sharma |
| 2015/0371611 A1 | 12/2015 | Raley |
| 2017/0110887 A1 | 4/2017 | Bell |

OTHER PUBLICATIONS

European Search Report for EP Application No. 16 15 5390, dated Jul. 19, 2016, 5 pages.

N. Merhav; V. Bhaskaran, "Fast Algorithms for DCT-Domain Image Down-Sampling and for Inverse Compensation", Journal IEEE Transactions on Circuits and Systems for Video Technology Archive, (Jun. 1997), vol. 7, No. 3, XP002759993, 9 pages.

* cited by examiner

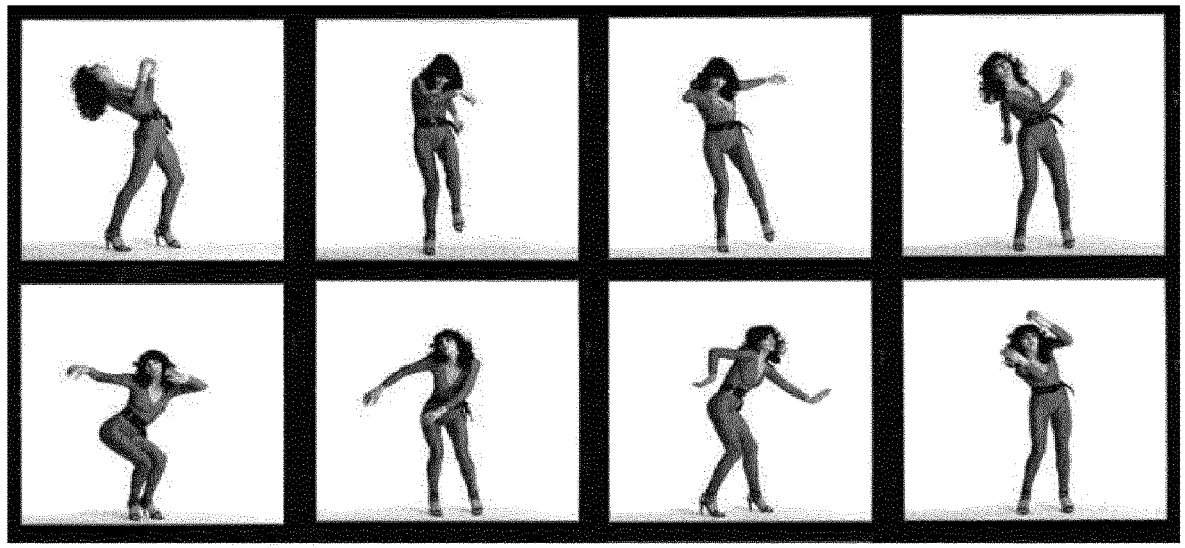
Fig. 5
Fig. 6
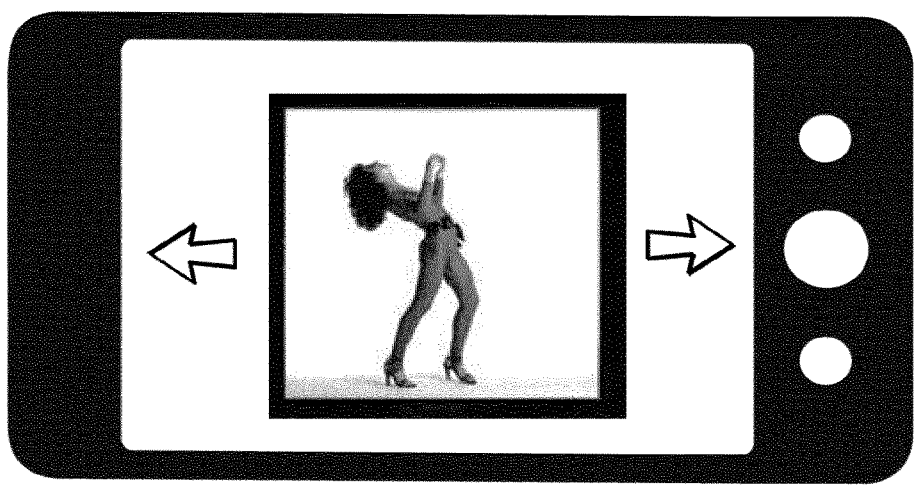

METHOD AND SYSTEM TO SHARE A SNAPSHOT EXTRACTED FROM A VIDEO TRANSMISSION

CROSS-REFERENCES TO RELATED APPLICATIONS

This application is a continuation of U.S. patent application Ser. No. 16/076,964, filed Aug. 9, 2018, which is a National Stage Application of International Application No. PCT/EP2017/052949, filed Feb. 10, 2017, which claims priority to European Patent Application No. 16155390.4, filed Feb. 12, 2016, the entire contents of each which are incorporated herein by reference in their entirety for all purposes.

INTRODUCTION

The present invention refers to the field of television experience in particular the simultaneous use of the mobile device and a television to share a user's experience.

BACKGROUND ART

The first step to screenshot on television program was the "freeze" function. With the arrival of digital television, it was quiet simple to freeze the current image using the remote control to send the instruction to the television. The signal being processed by the internal processor of the television, it was then easy the loop on the internal memory to have a still image displayed on the screen.

The second step was the possibility to print the frozen image. Known solutions exist to link the television to a printer and then print the frozen image. It was also possible to save this image in a memory of the television for later use.

For example, conventional wireless display technology may project the contents on a display device connected with the wireless display host via a wireless display device. Examples of the wireless display host may comprise a computer, a tablet, a smart phone or other communication device. Examples of the display device may comprise a television, or other big screen monitor supporting the wireless display technology. However, it is usually difficult for people to use their personal devices, such as smart phones, tablets and/or others, to obtain a screenshot of interest from the contents, when they watch the contents projected on the display device. In this case, we have the personal device used in the same manner as a remote control to trig the production of the screenshot.

BRIEF DESCRIPTION OF THE INVENTION

A method and system to facilitate the generation of snapshot from video transmission currently transmitted to a receiver device is discussed herein.

The method may share a snapshot with a third party device, said snapshot being part of a video transmission received by a receiver, said receiver having a screen output and being connected with a mobile device, said method comprising the steps of:

receiving a video transmission by the receiver,
converting by the receiver, the video transmission into a lower-bandwidth video transmission,
sending the lower-bandwidth video transmission to the mobile device,
displaying the lower-bandwidth video transmission on a screen of the mobile device,
receiving by the mobile device, an instruction to execute a snapshot,
transmitting said instruction to the receiver,
producing, by the receiver, a snapshot from the video transmission,
sending the snapshot to the mobile device,
posting the snapshot to a third party server, at a location specified by a link address,
sharing the link address to the third party device.

An image snapshot is understood to be an image of what is currently displayed on the screen at the time the snapshot was instructed or what was displayed on the screen shortly before the instruction to take the snapshot arrived. A snapshot can also be a video snapshot comprising a short video sequence of the images currently displayed on the screen at the time the snapshot was instructed or shortly before the instruction to take the snapshot.

Another aspect of the present disclosure is the concurrent transmission of the video transmission to the mobile device in order to facilitate the snapshot operation. In some embodiments, the receiver may facilitate the snapshot operations without sending the complete video transmission to the mobile device, in particular in view of the limited bandwidth between the receiver and the mobile device. For example, the receiver can prepare a lower-bandwidth version of the video transmission to send this version to the mobile device.

BRIEF DESCRIPTION OF THE FIGURES

The present disclosure will be better understood in view of the attached figures in which:

FIG. 5 illustrates an example of a contact sheet for the selection of the snapshot image,
FIG. 6 illustrates another way to select the snapshot image.

DETAILED DESCRIPTION

Figure 1:
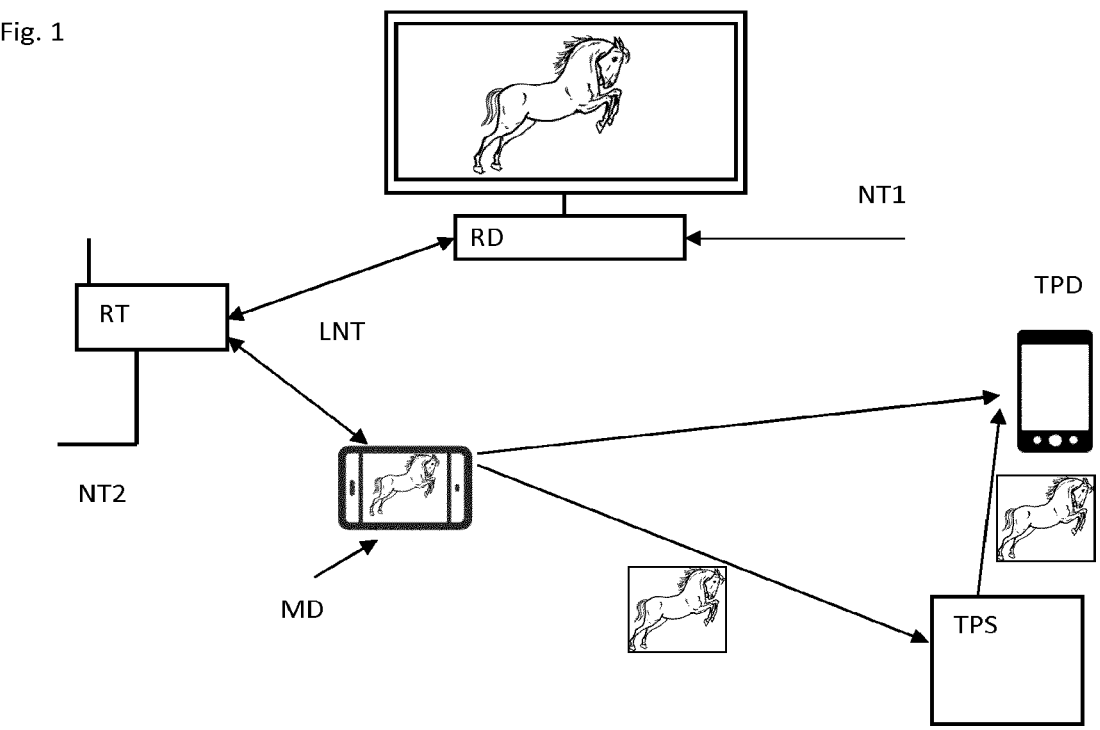
FIG. 1 illustrates the system of the invention.

The FIG. 1 illustrates the different elements taking part of the present invention. The receiver RD can receive the video transmission in various ways. As illustrated in FIG. 1, the input NT1 for the case when the receiver is connected to a cable or an antenna. The receiver can receive the video transmission through Internet (NT2) via the network router RT (e.g. Over The Top (OTT) transmission). The content selected by the user is then decoded and transferred to the screen.

The video transmission can also be stored in the receiver RD or played from a local source such as a DVD player. As a consequence, the expression "receiving a video transmission" can be understood as receiving from an external source (e.g., network NT1 or NT2) or an internal source (e.g., DVD, Harddrive, etc.).

The receiver RD is connected through a network router RT and therefore has access to the other devices of the user and to Internet (NT2). One of the devices is a mobile device MD such as a tablet or a smartphone.

The receiver can be a set-top box (STB), or a module integrated into the television or a module such as USB dongle or PCMCIA card connected to the television. In these last two examples, the receiving module receives a compressed video transmission selected by the host (the television) and returns a compressed video transmission to the host. The decompression module DEC as well as the audio/video module AVM are located into the host. In case that the invention is implemented in such a receiving module, the snapshot is created from the compressed video transmission. It is to be noted that said receiving module comprises a network interface LCM to communication with the mobile device MD.

From the received video transmission, the receiver RD prepares a lower-bandwidth video transmission and sends it to the mobile device MD. This lower-bandwidth video transmission can be produced by converting the nominal bandwidth video transmission to a lower bandwidth by downsampling the nominal video transmission so as to reduce the bandwidth. The resolution of the lower-bandwidth video transmission can be reduced and maintain a compatible format with the screen of the mobile device MD. As an example, the nominal video transmission is HD quality, i.e. with a resolution of 1920×1080 pixels. With the downsampling module DSM of the receiver RD, the resolution of the lower-bandwidth video transmission is reduced to 1280×720 pixels or 1024×768 pixels. For example, downsampling algorithms may include:

"Fast Algorithms for DCT-Domain Image Down-Sampling and for Inverse Compensation" by N. Merhav and V. Bhaskaran, Journal IEEE Transactions on Circuits and Systems for Video Technology archive Volume 7 Issue 3, June 1997;

"Complexity Optimized Video Codecs", in particular the chapter 8.2 by Michael Krause "A fast arbitrary-ratio downscaling algorithm for video transcoding" published in "Proceeding SIP '07 Proceedings of the Ninth IASTED International Conference on Signal and Image Processing" Pages 254-258 The downsampled video presentation can be a lighter version of the nominal video transmission in terms of bandwidth and represent a lower-bandwidth video transmission. The term "lower" means that the bandwidth for the lower-bandwidth video transmission is lower than the bandwidth used for the nominal video transmission (also called video transmission). The lower-bandwidth video transmission is sent to the mobile device MD in parallel to the transmission of the nominal video transmission to the main screen attached to the receiver.

According to a particular embodiment, the receiver RD can select among different target resolutions as lower-bandwidth video transmission, the selection being made during an initialization phase on the receiver. The mobile device can then test if the bandwidth available on the network accommodates the lower-bandwidth video transmission. In response to the available bandwidth being below a threshold, the mobile device can select another target resolution.

The lower-bandwidth video transmission is sent from the receiver RD to the router RT connected with the receiver and from the router RT, to the mobile device MD via the network LNT. The network LNT may be a local network through a Wifi router. The mobile device can display the lower-bandwidth video transmission on its screen. It is to be noted that the receiver RD can play the role of the router (a router/receiver device), thus the lower-bandwidth video transmission is sent from the receiver RD directly to the mobile device MD.

When the user triggers a snapshot, said user enters a command to the mobile device MD. The mobile device then send a message, via the home network LNT, to the receiver RD. The message may comprise a command to execute a snapshot, and optionally can further comprise the type of snapshot (image or video).

At the reception of the message, the receiver proceeds to produce a snapshot.

Image Snapshot

The image snapshot is understood as a still image representing one image that is or was sent to the screen attached to (or part of) the receiver.

According to a first embodiment, the current image processed by the audio video module AVM from the video transmission is extracted and sent to the snapshot module SCM. This operation is transparent for the viewer watching the main screen. For that purpose, the snapshot module SCM may have access to the memory of the audio video module AVM.

This image represents the current frame in full resolution as it is sent to the screen at the time the snapshot message is received by the receiver. This image can be compressed into formats (e.g., JPEG, GIF, TIFF, etc.) to produce the snapshot image.

When the receiver RD receives a message from the mobile device to execute a snapshot, the receiver extracts the currently displayed image and prepares the snapshot image. Once compressed with into a suitable format, the snapshot image is sent to the mobile device MD.

Video Buffer

According to one embodiment of the invention, the receiver comprises a video buffer BF that stores part of the video transmission already sent (or currently being sent) to the decompression module DEC of the receiver. The buffer BF will then contain a predefined time of the video transmission, constantly updated in a first in, first out function. The video buffer BF contains the last n seconds of the video transmission (e.g. n could vary from 1 to 20 seconds) corresponding to the n seconds preceding the current display of the video transmission. The snapshot module SCM can either receive the current image from the audio video module AVM or receive the current image from the video buffer BF. In the latter case, the content of the video buffer being in compressed form, the snapshot module decompresses the content extracted from the video buffer to create the snapshot image.

It is to be noted that once the receiver has received a snapshot message, the video buffer BF is frozen and no new data is added to the buffer. The video buffer BF will contain the last n seconds preceding the reception of the snapshot instruction. The frozen status is released when the snapshot operation is completed.

Video Snapshot

The video snapshot should be understood to be a short extract of the video transmission currently transmitted to the screen attached to the receiver. When the instruction is received to process with a video snapshot, the snapshot module SCM accesses the video buffer BF to obtain a video extract of a first length. The snapshot module prepares a downsampled video extract by down-sampling the video extract in order to reduce the bandwidth necessary to transmit the extract to the mobile device.

The receiver then sends to the mobile device MD the downsampled video extract. The mobile can present an interface to the user to select a starting point and an ending point of the video extract. Once selected, the mobile device sends the points to the receiver. The snapshot module prepares a video snapshot of a length as specified by the starting point and the ending point. This video snapshot is then sent to the mobile device.

Image Snapshot Selection

According to one embodiment, the snapshot module, in response to receiving the message to execute a snapshot, produces multiple of image snapshots from the video extract stored in the buffer. Each image is formed from the video that is extracted from the buffer by decompressing the video. The snapshot module forms multiple images representing the slow motion of the video extract at different times, such that each image is spaced according to a predefined setting (e.g. each image being spaced by 500 ms).

The plurality of images is downsampled and sent to the mobile device. The mobile device proposes to the user the plurality of downsampled images for selection. The mobile device can include an interface to select the images, for example, in the form of a contact sheet (as illustrated in the FIG. 5) or a flip through interface (as illustrated in the FIG. 6).

A selection is made by the user for one or a subset of the images and this selection is sent to the receiver. With the selection of the at least one image, the receiver can prepare the corresponding image snapshot at the initial resolution and sent it back to the mobile device.

According to a particular embodiment, the snapshot module may employ the GOP structure of the compressed video extract. The GOP is a group of pictures starting with a I frame (Intra-coded picture), containing the full image, followed by a plurality of P frames (Predicted picture) and B frames (Bi-predictive picture). These frames can represent the differences versus the previous frame. The snapshot extracts the I-frames from the video extract and then prepares the downsampled version of these I frames.

Posting the Snapshot

When the selected snapshot is received by the mobile device, the mobile device MD can post the snapshot to a third party server TPS. The TPS can be a social network server (e.g. Facebook™, Instagram™) or a private server. While posting the snapshot to the third party server TPS, the mobile device receives from the server a link address representing a location where the server has stored the snapshot.

The mobile device can add credential to the snapshot (e.g., user name, password, etc.), for example, to allow the TPS to identify and authorize the posting of the snapshot.

The mobile device can then share a message containing the link address to a third party device TPD.

According to a preferred embodiment, before the mobile device shares the link with a third party device, the user of the mobile device can add comments (i.e. free text) in the message comprising the link. An editor is presented to the user to type some comments, i.e. the reason why this snapshot has some interest. The free text is added to the message, thus containing the link address and the free text.

The user can select one or more recipients from a contact list to share the message to third party devices TPD.

Once the third party device TPD has received the message from the mobile device, the mobile device can read the free text and retrieve the snapshot from the third party server TPS using the link address contained in the message.

According an embodiment, the message can further contain metadata related to the video transmission. The receiver extracts from the video transmission metadata describing the content of the video transmission. Metadata can be the title of the movie currently transmitted, for example, or a description of the content (e.g. "X factor Saison 2015"). The metadata can further contain the description of the channel from which the video presentation is obtained (e.g. "ITV2").

The receiver transmits the metadata to the mobile device with the snapshot. The mobile device adds the metadata to the message shares the message with third party devices. In an alternate embodiment, the metadata as well as the free text, is sent with the snapshot to the third party server. The third party device, in response to receiving the message containing the link address, can retrieve the snapshot as well as the metadata and the free text.

Synchronization Buffer

Figure 3:
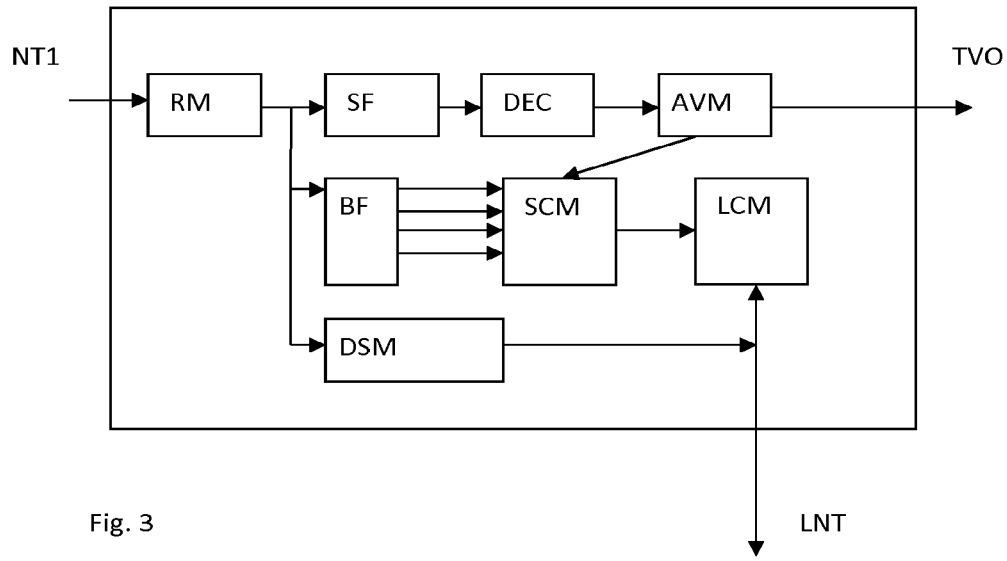
FIG. 3 illustrates the synchronization buffer of the receiver

According to a particular embodiment of the present invention presented in the FIG. 3, the receiver includes a synchronization buffer SB, located between the reception of the compressed signal and the transmission of the decompressed signal to a screen output. The synchronization buffer is used to synchronize the display of the lower-bandwidth video transmission received by the mobile device and the nominal video transmission displayed on the main screen. The preparation of the downsampled video transmission, the transmission through the network LNT as well as the processing by the mobile device takes time. Without the synchronization buffer, the image displayed on the mobile device may be delayed several 100 ms. Accordingly, the length of the synchronization buffer is adjusted so that both screens (the mobile device and the main screen) are synchronized. The mobile device can adjust the length in accordance with a particular condition, such as taking into account the available bandwidth of the network LNT and/or the time to process the lower-bandwidth video transmission by the mobile device.

In the FIG. 3, the synchronization buffer is located prior to the decompression module DEC. Alternatively, the synchronization buffer can be located at the exit of the decompression module, thus storing decompressed frames.

According to one embodiment, during an initialization phase, the mobile device can display the lower-bandwidth video transmission and send commands to the receiver to adjust the length of the synchronization buffer. In an embodiment, the mobile device may present an interface with two arrows displayed on top of the lower-bandwidth video transmission to allow the user to adjust the delay created by the synchronization buffer. Each time that the user presses on one arrow, a command is sent to the receiver and the length of the synchronization buffer is adjusted, by step of 50 ms for example, either forward or backward.

Settings

The mobile device MD preferably comprises a dedicated application for the snapshot operation, thus being able to display the lower-bandwidth video transmission and transmits commands to the receiver. The dedicated application can also present to the user to set-up a default mode of operation. The user can then configure if he/she prefers to have an image or a video snapshot, configure the length of the video extract or the number of the downsampled images, etc. The resolution of the lower-bandwidth video transmission can also be selected in accordance with the resolution of the mobile device's screen. Once the user has selected the default mode, the mobile device transmits these setting to the receiver.

Recording Logs

According to one embodiment, when a snapshot is generated, a log record is created and transmitted to a remote server. The log record may contain an identification of the video transmission, preferably extracted from the metadata, and information about the particular segment of the video transmission used to create the snapshot. This information can be in the form of a time index or a frame index. In case of a video snapshot, the information is a start time and end time or start frame index and end frame index. Additional information can be added such as the current channel (for example in the form of the DVB Triplet) containing the video transmission, or identification of the receiver.

According to a first embodiment, the log record is created by the receiver and transmitted to the remote server by the receiver. For that purpose, the receiver is preferably connected to Internet and has access to the remote server.

According to a second embodiment, the log record is created in the dedicated application loaded into the mobile device, at the time of the posting of the snapshot. The mobile device can add its identification (user identification) to the log record and send the log record to the remote server.

The remote server can then analyze the user's reaction and which video transmission has generated the most snapshots by the users. This feature opens the possibility of rewarding the user for posting a particular content such as an advertisement. The remote server comprises a database and keeps track of the activity of a user. The remote server stores the activity of a user and accumulates the log records for said user. In case that a snapshot for a particular advertisement (e.g. for a new car) has been posted to the third party server n times, the user, via the mobile device can receive an invitation for a free ride with the new car.

Adding Banner

The metadata of the video transmission can not only contain a description of the content but can also contain banner information. Banner information could be in the form of a text or an image. This banner information will be visually added on the snapshot at the time of the production of the snapshot by the receiver. The banner information is extracted from the video transmission and converted into an image added to the snapshot. In case of text information, the receiver generates the corresponding characters to be added into the snapshot. In case of an image, the image is added to the snapshot. The banner information can further comprise location indication, i.e. the location where the text or the image should be added into the snapshot. The operation of adding the banner can be an operation of overlaying the banner on the snapshot or replacing a section of the snapshot by the banner.

Enabling/Disabling Snapshot

The metadata of the video transmission can not only contain a description of the content but can also contain instruction related to the snapshot operation. The metadata further comprise a snapshot status to enable or disable the snapshot (1=enabled, 0=disabled). Before the snapshot module SCM starts the production of the snapshot, it read the snapshot status to check whether it is authorized to produce a snapshot. In case that the snapshot is disabled, the receiver returns a message to the mobile device to inform it that this function is not available yet.

Receiver

Figure 7:
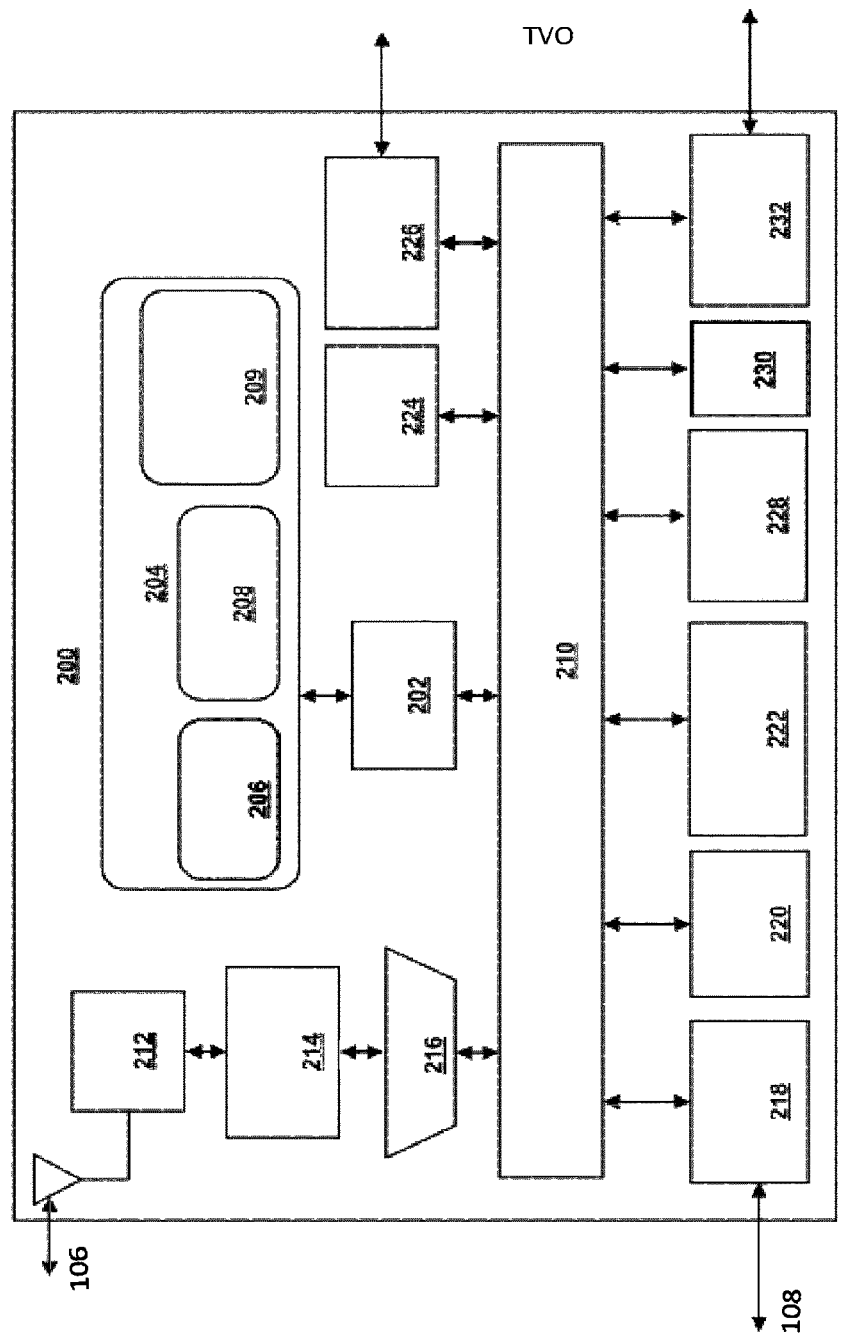
FIG. 7 illustrates a receiver to execute the snapshot.

For the purpose of executing the present disclosure, the receiver RD, and more generally a computing device 200 is illustrated in the FIG. 7.

Figure 2:
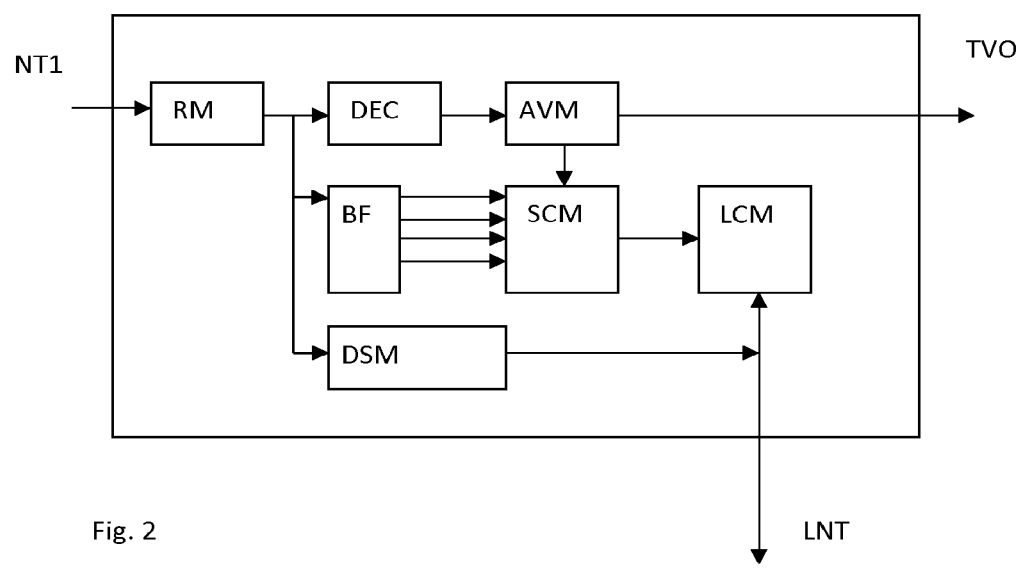
FIG. 2 illustrates the different modules in the receiver.

FIG. 7 is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, a digital video recorder, etc.), a portable computing device (e.g., a mobile phone, a laptop, a personal data assistant (PDA), a tablet device, a portable gaming device, etc.) or another type of computing device. In the example illustrated in FIG. 2, computing device 200 is configured to receive data via a television network, such as, for example, television network 106 or NT1 described above and send and receive data via a data network, such as, for example, a public or local network 108 or LNT. It should be noted that in other examples, computing device 200 may be configured to send and receive data through one of television network 106 or local network 108. The techniques described herein may be utilized by devices configured to communicate using any and all combinations of communications networks.

As illustrated in FIG. 7, computing device 200 includes central processing unit(s) 202, system memory 204, system interface 210, modem 212, transport module 214, audio-video de-multiplexer (AVdemux) 216, network interface 218, storage device(s) 220, user interface(s) 222, audio decoder 224, audio processor 226, video decoder 228, graphics processing unit 230, and display processor 232.

As illustrated in FIG. 7, system memory 204 includes operating system 206, applications 208, and content selection application 209. Each of central processing units(s) 202, system memory 204, system interface 210, modem 212, transport module 214, AV demux 216, network interface 218, storage device(s) 220, user interface(s) 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations. In some examples, functionality of computing device 200 may be implemented using one or more so-called systems on a chip (SOC). For example, computing device 200 may include a set-top box including a SOC. One example of a commercially available SOC that may be included in a set-top box is the Broadcom®BCM7252 Ultra HD SoC. Central processing unit(s) 202 may be configured to implement functionality and/or process instructions for execution in computing device 200. Central processing unit(s) 202 may be capable of retrieving and processing instructions, code, and/or data structures for implementing one or more of the techniques described herein. Instructions may be stored on a computer readable medium, such as system memory 204 or storage device(s) 220. Central processing unit(s) 202 may
include multi-core central processing units. As described in detail below, the techniques described herein may be used to optimize CPU usage. For example, one or more background processing techniques may be used to reduce the delay (or lag) experienced by a user interacting with one of the graphical user interfaces described below.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by computing device 200 during operation. System memory 204 may be used to store program instructions for execution by central processing unit(s) 202 and may be used by software or applications running on computing device 200 to temporarily store information during program execution. For example, system memory 204 may store instructions associated with operating system 206, applications 208, and content selection application 209. System memory 204 may include one or more distinct memory devices, where each memory device may include a distinct type of memory interface. For example, system memory 204 may include an internal hard disk or solid state drive, a random access memory module, an embedded MultiMediaCard (eMMC) memory device, and/or one or more caches (e.g., CPU caches and/or GPU caches). As described in detail below, images associated with a graphical user interface may be loaded from a portion of system memory 204 to another portion of system memory 204 in order to reduce the time required to render the images on a display based on received user inputs. For example, a subset of images associated with a graphical user interface may be loaded into a cache based on user behavior. It should be noted that the techniques described herein may be generally applicable to any memory architecture.

Applications 208 and content selection application 209 may include applications implemented within or executed by computing device 200 and may be implemented or contained within, operable by, executed by, and/or be operatively/communicatively coupled to components of computing device 200.

Applications 208 and content selection application 209 may include instructions that may cause central processing unit(s) 202 of computing device 200 to perform particular functions. Applications 208 and content selection application 209 may include algorithms which are expressed in computer programming statements, such as, for-loops, while-loops, if-statements, do-loops, etc. Applications 208 and content selection application 209 may be distributed to computing device 200 through an application distribution site, for example, application distribution site 122. In one example, applications 208 and content selection application 209 may cause computing device 200 to perform functions associated with the example techniques described herein that enable a user to access items of content. Applications 208 and content selection application 209 may cause one or more graphical user interfaces to be presented that enable a user to provide data for use by an application. In one example, applications 208 may include one or more dedicated applications enabling a user to access a digital media service. It should be noted that as used herein a dedicated application enabling a user to access a digital media service may be high integrated with an application or operating system of a computing device.

For example, a set-top box supported by a cable television provider may enable a user to access items of content from a television service, an on demand media service maintained by the cable television service provider, and/or a third party media streaming service. In some cases, each distinct graphical user interface enabling a user to select items of content to access may be referred to as a dedicated application, a source, and/or a portal. In one example, content selection application 209 may be provided to a computing device and cause a computing device to enable a user to select items of content according to one or more of the techniques described herein.

As described in detail below content selection application 209 may operate in conjunction with an application running on a companion device, such as a mobile device.

As further illustrated in FIG. 7, applications 208 and content selection application 209 may execute in conjunction with operating system 206. That is, operating system 206 may be configured to facilitate the interaction of applications 208 and content selection application 209 with central processing unit(s) 202, and other hardware components of computing device 200. It should be noted that in some examples, components of operating system 206 and components acting in conjunction with operating system 206 may be referred to as middleware. Further, in some examples, content selection application 209 may include an application programming interface (API). The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or
gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210 may be configured to enable communications between components of computing device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express (PCIe) bus specification, which is maintained by the Peripheral Component Interconnect Special Interest Group, or any other form of structure that may be used to interconnect peer devices.

Storage device(s) 220 represent memory of computing device 200 that may be configured to store relatively larger amounts of information for relatively longer periods of time than system memory 204. For example, in the example where computing device 200 is included as part of a digital video recorder, storage device(s) 220 may include a hard disk drive configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements.

User interface(s) 222 may include devices configured to receive input from a user during operation of computing device 200. For example, user interface(s) 222 may include buttons and switches, motion sensors (e.g., accelerometers), touch-sensitive sensors, a track pad, a mouse, a keyboard, a microphone, a video camera, or any other type of device configured to receive user input. User interface(s) 222 may be integrated into computing device 200. For example, in the case where computing device 200 includes a television, user interface(s) 222 may include push buttons located on the television. Further, user interface(s) 222 may be integrated into devices external to computing device 200. For example, user interface(s) 222 may be integrated into a companion device, such as, for example, companion device 300 and companion device 400 described in detail below. In some examples, an external device including user interfaces(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol. It should be noted that techniques described herein may be generally applicable regardless of the type of device including a user interface and regardless of the manner in which the device communicates with computing device 200. As described in detail below, user interface(s) 222 may include a display configured to display the graphical users interfaces described herein. For example, in the case where computing device 200 includes a television, a companion device (e.g., a smart phone or a dedicated remote controller) in communication with a television may include a user interface including a touch-sensitive display presenting a graphical user interface described herein. Further, as described in detail below, a user may provide commands to computing device 200 by activating portions of a touch-sensitive display.

Referring again to FIG. 7, computing device 200 is configured to send and receive data via a local network, such as, for example, television network 106 described above and send and receive data via a public network, such as, for example, public network 108. This network is used also to transmit and receive data from the mobile device. A communications network may be described based on a model including layers that define communication properties, such as, for example, physical signaling, addressing, channel access control, packet properties, and data processing in a communications system. In the example illustrated in FIG. 7, modem 212, transport module 214, and AV demux 216 may be configured to perform lower layer processing associated with television network 106 and network interface 218 may be configured to perform lower layer processing associated with public network 108.

Other Embodiments

Figure 4:
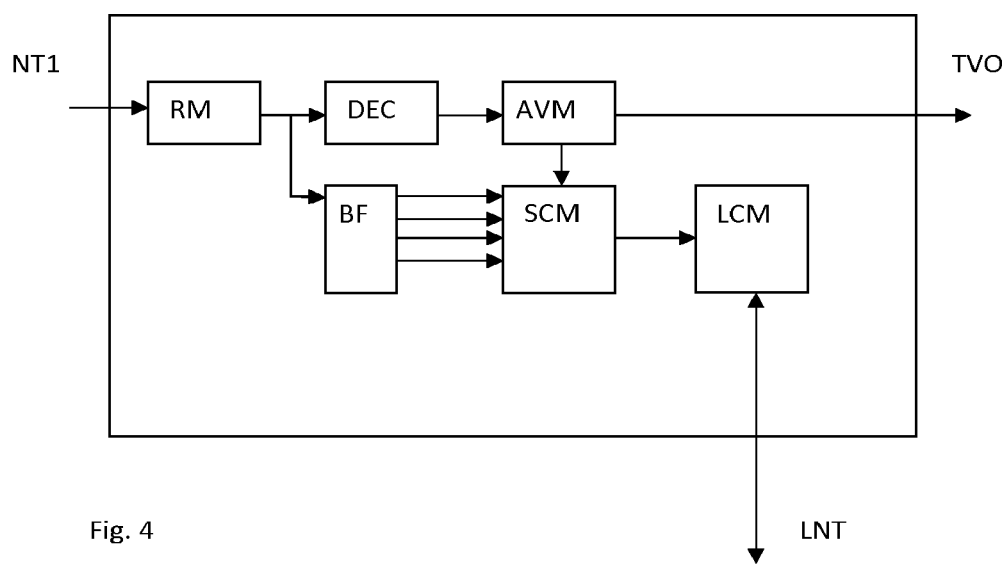
FIG. 4 illustrates an alternate embodiment without the transmission of the video transmission to the mobile device.

One aspect of the present invention, as illustrated in the FIG. 4, is the use of the video buffer to select the snapshot at a time before the reception of the snapshot instruction by the receiver. In this alternate embodiment, there is no lower-bandwidth resolution of the video transmission sent to the mobile device. The mobile device may not display in real time the video transmission. The mobile device can include an application to carry out all other operations, i.e. sending the snapshot instruction and selecting the proper snapshot (either still image or video) extracted from the video buffer.

In another embodiment, the concurrent transmission to the mobile device is done with the same video transmission, without reducing the bandwidth. In case that the available bandwidth of the network accommodates the necessary bandwidth for the nominal video transmission, the nominal video transmission is sent by the receiver to the mobile device. Accordingly, the receiver of the present disclosure may perform without the conversion module DSM. In this case, the mobile device receives the nominal video transmission. The receiver sends a snapshot according to the initial resolution (image or video snapshot) and the snapshot selection is made on the initial resolution on the mobile device.

In this embodiment, implementing the synchronization buffer SB is an option and motivated if the transmission of the nominal video transmission is delayed during the transmission to the mobile device.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A method of creating one or more snapshots, the method comprising:
   receiving, by a first device, a video having a first quality level, the first device including a receiver device;
   converting, by the first device, the video into a lower-quality video having a second quality level, the second quality level being associated with a lower quality than the first quality level;
   sending, by the first device, the lower-quality video to a second device;
   receiving, by the first device from the second device as the lower-quality video is displayed by the second device, a command to produce a snapshot using the video having the first quality level;
   based on the command received by the first device, producing a plurality of downsampled snapshots from at least a portion of the video, each of the plurality of downsampled snapshots representing a different portion of the video at a different time;
   sending the plurality of downsampled snapshots to the second device;
   receiving, from the second device, a selection of at least one snapshot from the plurality of downsampled snapshots; and
   producing, by the first device at least based on the at least one selected snapshot, a snapshot from the video having the first quality level.

2. The method of claim 1, wherein the snapshot is posted to a third party server, a location of the third party server being specified by a link address.

3. The method of claim 2, further comprising:
   including comments with the snapshot posted to the third party server.

4. The method of claim 1, wherein producing the snapshot comprises extracting, from the video, metadata identifying the snapshot, the method comprising:
   sending the metadata to the second device.

5. The method of claim 1, wherein the snapshot is a video snapshot, the method comprising:
   producing, from at least the portion of the video, a downsampled video extract; and
   producing, by the first device, the video snapshot using a starting point and an ending point of the downsampled video extract selected by the second device.

6. The method of claim 1, further comprising:
   extracting, from the video, metadata related to the video;
   extracting, from the metadata, banner information; and
   visually adding the banner information to the snapshot.

7. The method of claim 1, further comprising:
   buffering, by the first device, the video in a buffer, the buffer containing at least the portion of the video during a predefined time;
   wherein the plurality of downsampled snapshots are produced from at least the portion of the video stored in the buffer.

8. The method of claim 7, wherein the lower-quality video is compressed video having a plurality of groups of pictures, each group of pictures starting with an Intra-coded frame (I Frame), wherein the buffer stores a plurality of I Frames of the lower-quality video, and wherein the plurality of downsampled snapshots are produced by extracting and downsampling each of the plurality of I Frames from the buffer.

9. The method of claim 1, further comprising:
   buffering the video in an adjustable length synchronization buffer, wherein an adjustable length of the adjustable length synchronization buffer is adjusted to synchronize display of the lower-quality video on the second device.

10. The method of claim 1, wherein sending the plurality of downsampled snapshots to the second device comprises sending the plurality of downsampled snapshots to a network device.

11. The method of claim 10, wherein the network device is a network router.

12. A first device for creating one or more snapshots, comprising:
    a memory;
    an input configured to receive a video having a first quality level, the first device including a receiver device;
    a conversion module configured to convert the video into a lower-quality video having a second quality level, the second quality level being associated with a lower quality than the first quality level;
    a network interface configured to send the lower-quality video to a second device; and
    a processor coupled to the memory, the processor configured to:
      receive, from the second device as the lower-quality video is displayed by the second device, a command to produce a snapshot using the video having the first quality level;
      based on the command received by the first device, produce a plurality of downsampled snapshots from at least a portion of the video, each of the plurality of downsampled snapshots representing a different portion of the video at a different time;
      send the plurality of downsampled snapshots to the second device;
      receive, from the second device, a selection of at least one snapshot from the plurality of downsampled snapshots; and
      produce, at least based on the at least one selected snapshot, a snapshot from the video having the first quality level.

13. The first device of claim 12, wherein the snapshot is posted to a third party server, a location of the third party server being specified by a link address.

14. The first device of claim 12, wherein the snapshot is a video snapshot, and wherein the processor is configured to:
    produce, from at least the portion of the video, a downsampled video extract; and
    produce the video snapshot using a starting point and an ending point of the downsampled video extract selected by the second device.

15. The first device of claim 12, wherein the processor is configured to:
    buffer the video in a buffer, the buffer containing at least the portion of the video during a predefined time;
    wherein the plurality of downsampled snapshots are produced from at least the portion of the video stored in the buffer.

16. The first device of claim 15, wherein the lower-quality video is compressed video having a plurality of groups of pictures, each group of pictures starting with an Intra-coded frame (I Frame), wherein the buffer stores a plurality of I Frames of the lower-quality video, and wherein the plurality of downsampled snapshots are produced by extracting and downsampling each of the plurality of I Frames from the buffer.

17. The first device of claim 12, further comprising:

buffering the video in an adjustable length synchronization buffer, wherein an adjustable length of the adjustable length synchronization buffer is adjusted to synchronize display of the lower-quality video on the second device.

18. The first device of claim 12, wherein, to send the plurality of downsampled snapshots to the second device, the processor is configured to send the plurality of downsampled snapshots to a network device.

19. A non-transitory computer-readable medium of a first device having stored thereon instructions that, when executed by one or more processors, cause the one or more processors to:

receive a video having a first quality level, the first device including a receiver device;

convert the video into a lower-quality video having a second quality level, the second quality level being associated with a lower quality than the first quality level;

send the lower-quality video to a second device;

receive, from the second device as the lower-quality video is displayed by the second device, a command to produce a snapshot using the video having the first quality level;

based on the command received by the first device, produce a plurality of downsampled snapshots from at least a portion of the video, each of the plurality of downsampled snapshots representing a different portion of the video at a different time;

send the plurality of downsampled snapshots to the second device;

receive, from the second device, a selection of at least one snapshot from the plurality of downsampled snapshots; and produce, at least based on the at least one selected snapshot, a snapshot from the video having the first quality level.

20. The non-transitory computer-readable medium of claim 19, further comprising instructions that, when executed by the one or more processors, cause the one or more processors to:

produce, from at least the portion of the video, a downsampled video extract; and produce the snapshot using a starting point and an ending point of the downsampled video extract selected by the second device.

* * * * *